US012771078B2

(12) United States Patent
Yamamura et al.

(10) Patent No.: US 12,771,078 B2
(45) Date of Patent: Oct. 20, 2026

(54) TERMINAL CONNECTING STRUCTURE, CONNECTOR, AND CONNECTING CONDUCTOR

(71) Applicant: YAZAKI CORPORATION, Tokyo (JP)

(72) Inventors: Kei Yamamura, Makinohara (JP); Noboru Hayasaka, Makinohara (JP); Jun Sugioka, Makinohara (JP); Kento Komon, Makinohara (JP); Tomohiro Ishihara, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 373 days.

(21) Appl. No.: 18/613,078

(22) Filed: Mar. 21, 2024

(65) Prior Publication Data

US 2024/0235128 A1 Jul. 11, 2024

Related U.S. Application Data

(63) Continuation of application No. PCT/JP2022/045688, filed on Dec. 12, 2022.

(30) Foreign Application Priority Data

Jan. 17, 2022 (JP) ................................ 2022-004986

(51) Int. Cl.
*H01R 13/6591* (2011.01)
*H01R 9/16* (2006.01)
(Continued)

(52) U.S. Cl.
CPC ......... *H01R 13/65915* (2020.08); *H01R 9/16* (2013.01); *H01R 13/6592* (2013.01);
(Continued)

(58) Field of Classification Search
CPC ................................ H01R 13/659; H01R 9/16
(Continued)

(56) References Cited

U.S. PATENT DOCUMENTS 10,950,369 B1 * 3/2021 Farkas ............... H01B 11/1834
2011/0316373 A1 12/2011 Kobayashi et al.
2014/0051286 A1 2/2014 Itsuki et al.

FOREIGN PATENT DOCUMENTS

JP S59-72685 U 5/1984
JP H10-50434 A 2/1998
(Continued)

OTHER PUBLICATIONS

International Search Report for PCT/JP2022/045688 dated Feb. 28, 2023.

*Primary Examiner* — Phuong K Dinh
(74) *Attorney, Agent, or Firm* — KENEALY VAIDYA LLP

(57) ABSTRACT

The present disclosure provides a terminal connecting structure that can both ensure flexibility a connecting conductor and prevent element wire breakage of the connecting conductor. A terminal connecting structure includes: a first braided wire formed by braiding an element wire having a first element wire diameter and including a first end portion and a second end portion; a second braided wire formed by braiding an element wire having a second element wire diameter, accommodated inside the first braided wire, and extending from the first end portion to the second end portion; a first terminal joined to the first end portion; and a second terminal joined to the second end portion. The first element wire diameter is greater than the second element wire diameter.

4 Claims, 7 Drawing Sheets

(51) Int. Cl.
*H01R 13/6592* (2011.01)
*H01R 35/00* (2006.01)
*H01R 9/05* (2006.01)

(52) U.S. Cl.
CPC ........... *H01R 35/00* (2013.01); *H01R 9/0518* (2013.01); *H01R 2201/26* (2013.01)

(58) Field of Classification Search
USPC .................................................. 439/578, 580
See application file for complete search history.

(56) References Cited

FOREIGN PATENT DOCUMENTS

| | | | |
|---|---|---|---|
| JP | 2014-38793 | A | 2/2014 |
| JP | 2015-26476 | A | 2/2015 |
| JP | 2015-82466 | A | 4/2015 |
| WO | 2011/055806 | A1 | 5/2011 |

* cited by examiner

TERMINAL CONNECTING STRUCTURE, CONNECTOR, AND CONNECTING CONDUCTOR

CROSS-REFERENCE TO RELATED APPLICATION

This application is a continuation application of International Application No. PCT/JP2022/045688 filed on Dec. 12, 2022 which claims the benefit of priority from Japanese Patent Application No. 2022-004986 filed on Jan. 17, 2022 and designating the U.S., the entire contents of which are incorporated herein by reference.

BACKGROUND OF THE INVENTION

1. Field of the Invention

The present invention relates to terminal connecting structures, connectors, and connecting conductors.

2. Description of the Related Art

There is a conventional technique of connecting terminals using a connecting conductor. Japanese Patent Application Laid-open No. 2015-082466 discloses a connector that includes a device-side terminal fitted and connected to a mating terminal, an electric-wire-side terminal connected to an end of an electric wire and fixed to a housing, and a connecting conductor connected between the device-side terminal and the electric-wire-side terminal and capable of expansion and contraction in an axial direction. The connector of Japanese Patent Application Laid-open No. 2015-082466 employs, as the connecting conductor, a braided wire in such a form that a bulging portion is disposed in a center in a length direction.

As a way to improve flexibility of a connecting conductor, it is conceivable to use a braided wire composed of element wires having a small diameter. Unfortunately, element wires having a small diameter cause a problem in that element wire breakage is prone to occur when the connecting conductor is joined to a terminal.

SUMMARY OF THE INVENTION

An object of the present invention is to provide a terminal connecting structure, a connector, and a connecting conductor that can both ensure flexibility of the connecting conductor and prevent element wire breakage of the connecting conductor.

In order to achieve the above mentioned object, a terminal connecting structure according to one aspect of the present invention includes: a first braided wire formed by braiding an element wire having a first element wire diameter, the first braided wire including a first end portion and a second end portion; a second braided wire formed by braiding an element wire having a second element wire diameter, the second braided wire being accommodated inside the first braided wire, the second braided wire extending from the first end portion to the second end portion; a first terminal joined to the first end portion; and a second terminal joined to the second end portion, wherein the first element wire diameter being greater than the second element wire diameter.

DETAILED DESCRIPTION OF THE PREFERRED EMBODIMENTS

A terminal connecting structure, a connector, and a connecting conductor according to an embodiment of the present invention will be described in detail below with reference to the drawings. Note that this embodiment should not be construed to limit this invention. Furthermore, constituents in the following embodiment include those that can readily be conceived by those skilled in the art or that are substantially the same.

Embodiment

Figure 1:
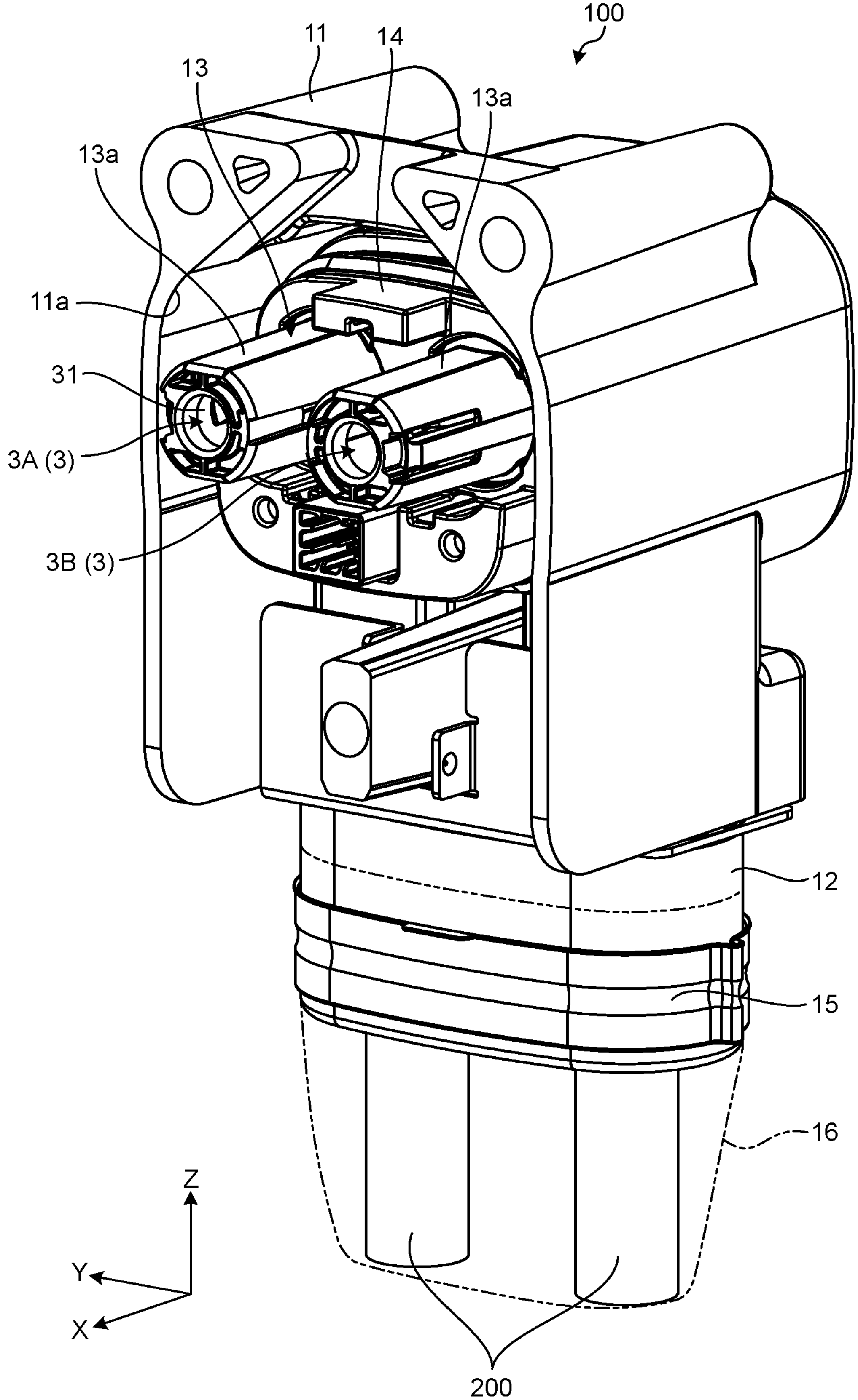
FIG. 1 is a perspective view illustrating a connector according to an embodiment.
Figure 2:
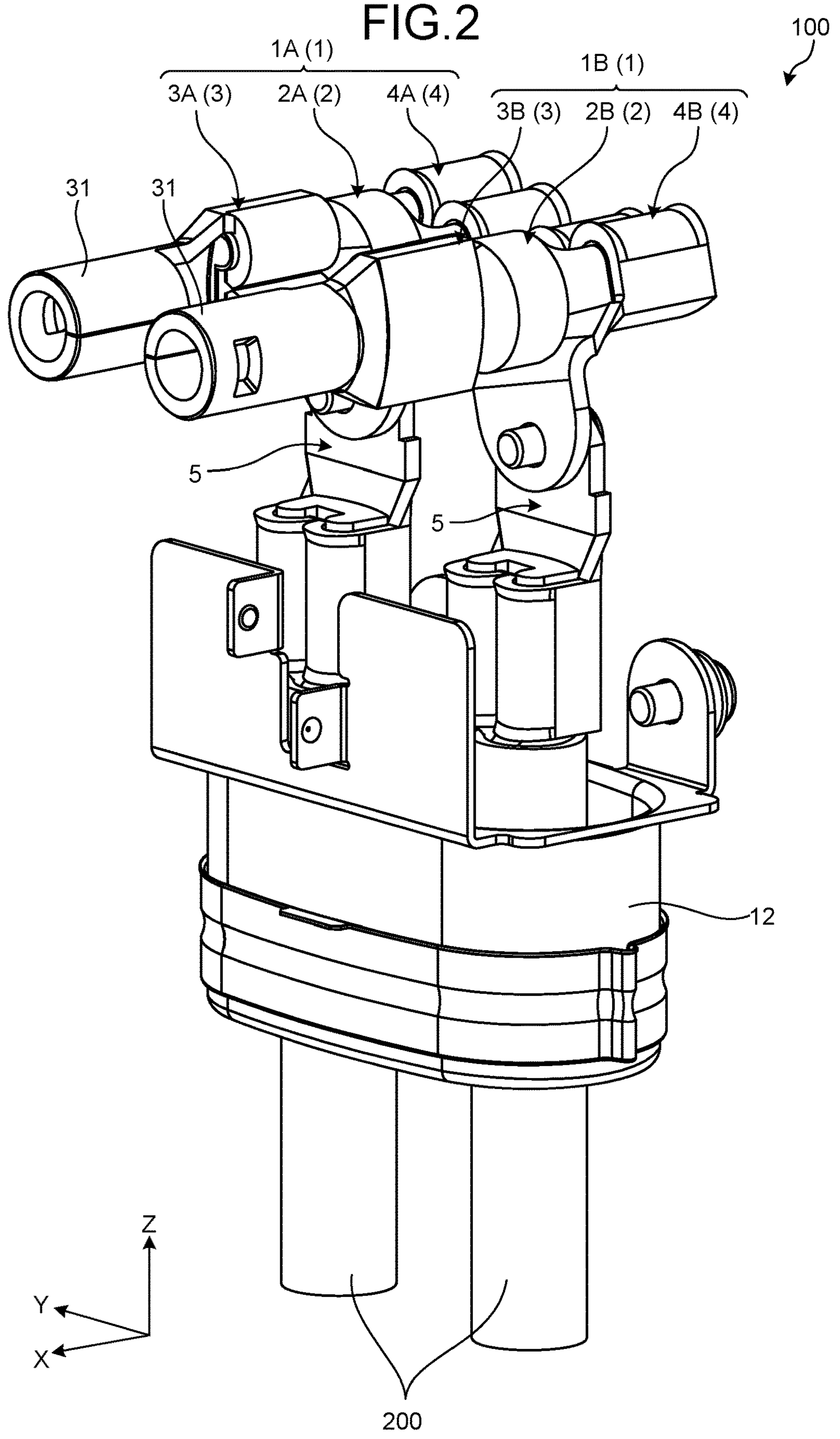
FIG. 2 is a perspective view illustrating an interior of the connector according to the embodiment.
Figure 3:
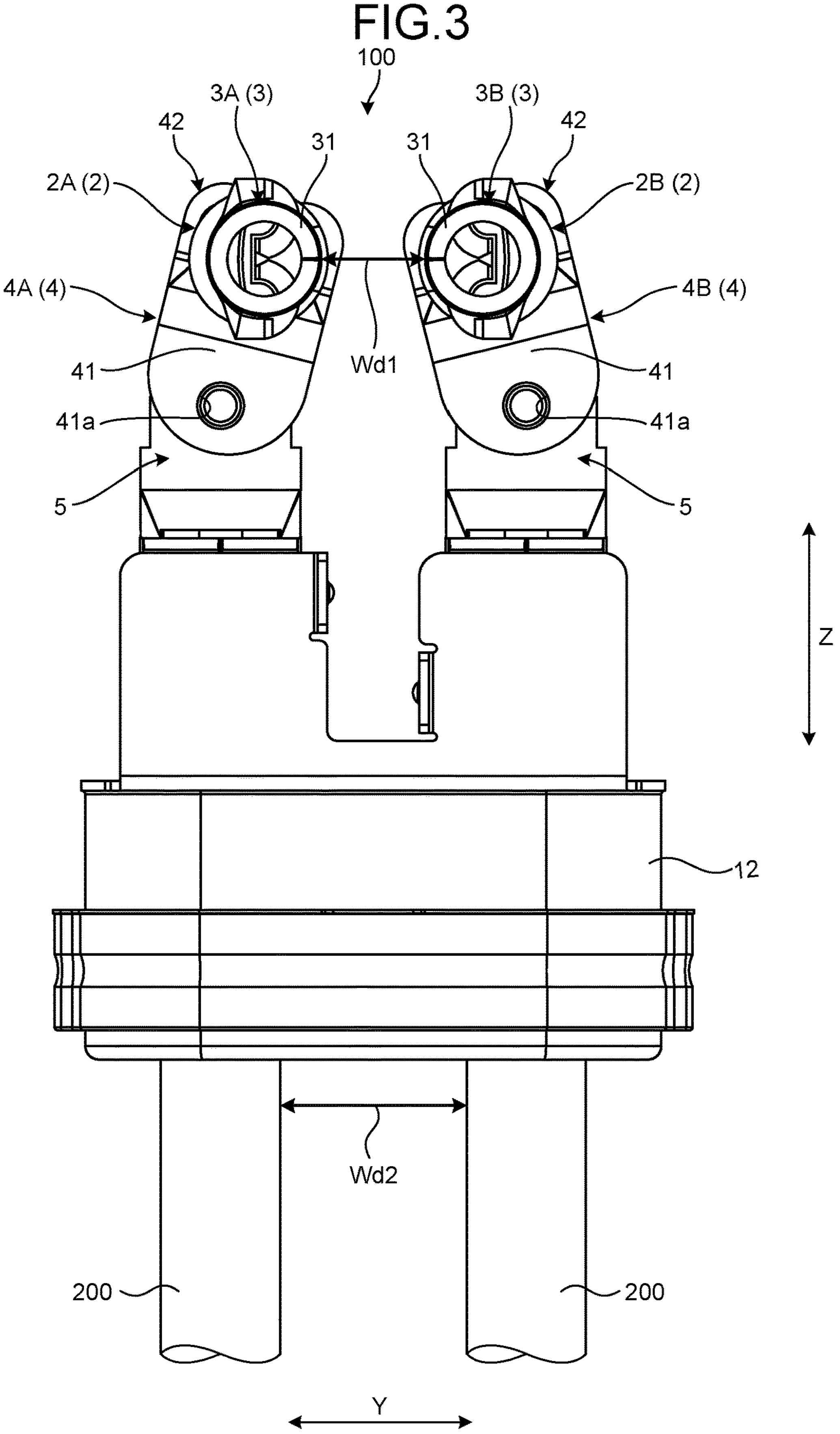
FIG. 3 is a front view illustrating the interior of the connector according to the embodiment.
Figure 5:
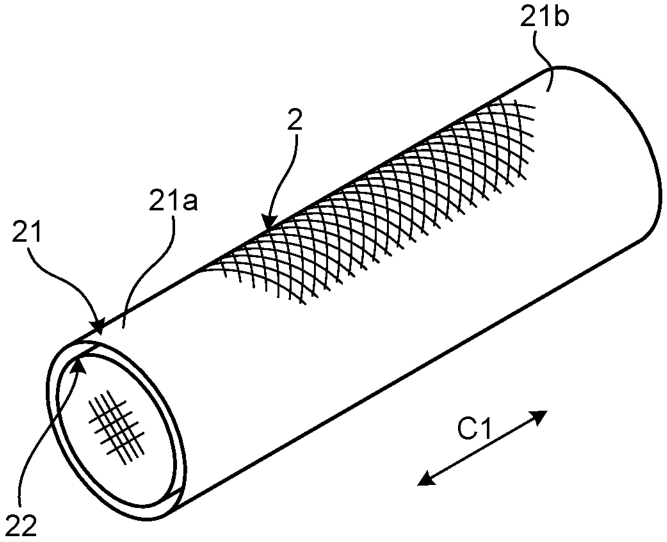
FIG. 5 is a perspective view illustrating a connecting conductor according to the embodiment.
Figure 6:
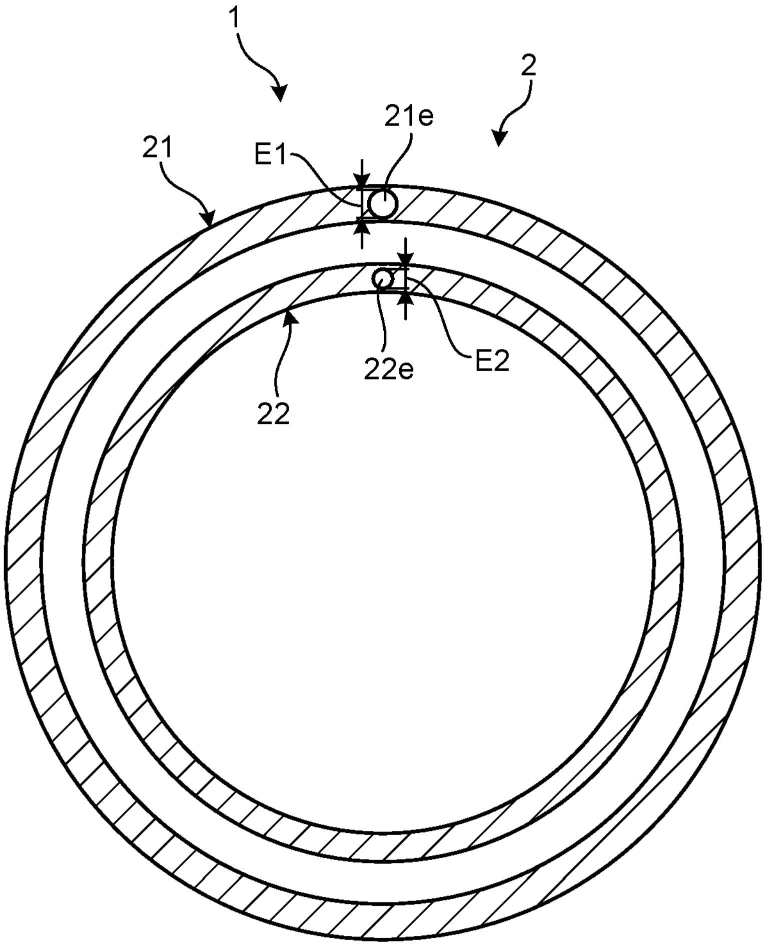
FIG. 6 is a front view of the connecting conductor according to the embodiment.
Figure 7:
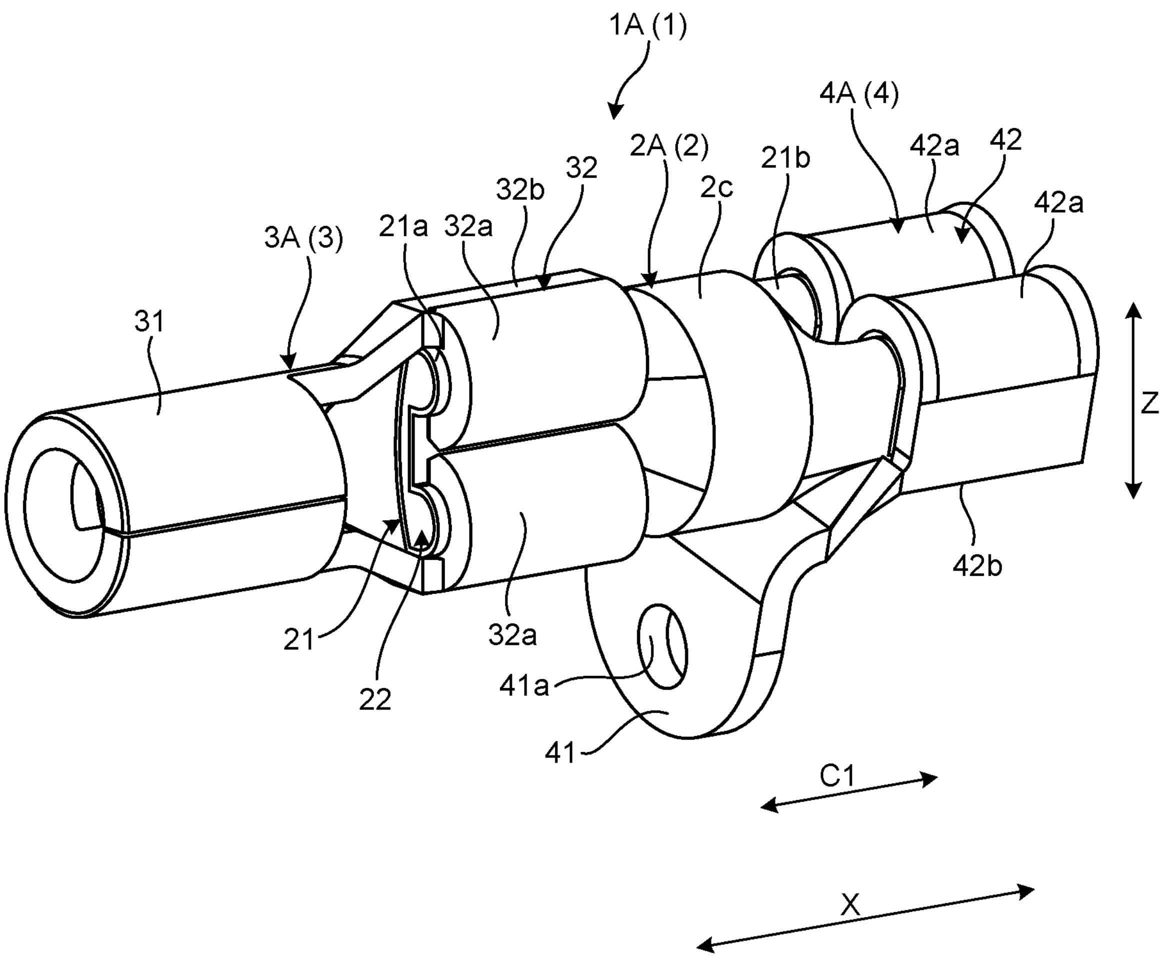
FIG. 7 is a perspective view illustrating a terminal connecting structure according to the embodiment.

An embodiment will be described with reference to FIGS. 1 to 9. This embodiment relates to a terminal connecting structure, a connector, and a connecting conductor. FIG. 1 is a perspective view illustrating a connector according to the embodiment, FIG. 2 is a perspective view illustrating an interior of the connector according to the embodiment, FIG. 3 is a front view illustrating the interior of the connector according to the embodiment, FIG. 4 is a side view illustrating the interior of the connector according to the embodiment, FIG. 5 is a perspective view illustrating a connecting conductor according to the embodiment, FIG. 6 is a front view of the connecting conductor according to the embodiment, FIG. 7 is a perspective view illustrating a terminal connecting structure according to the embodiment, FIG. 8 is a sectional view of a first terminal joined to the connecting conductor, and FIG. 9 is a sectional view of a second terminal joined to the connecting conductor.

Figure 4:
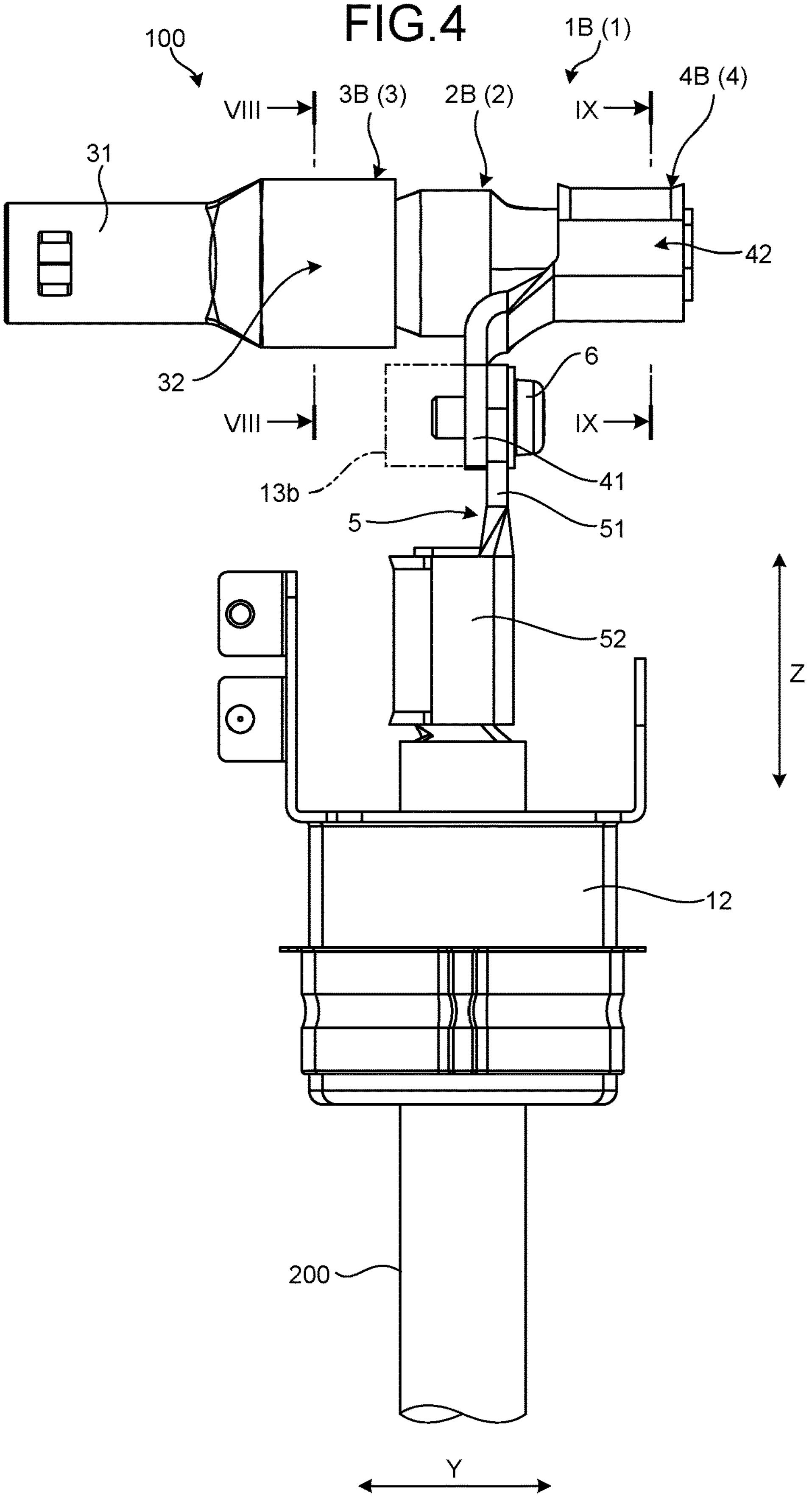
FIG. 4 is a side view illustrating the interior of the connector according to the embodiment.
Figure 8:
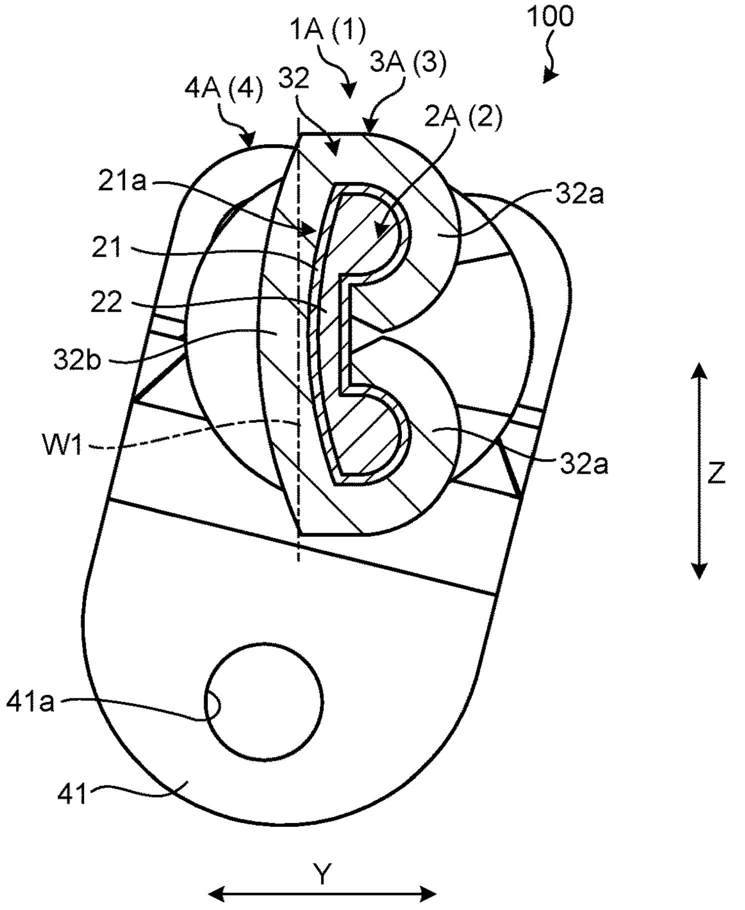
FIG. 8 is a sectional view of a first terminal joined to the connecting conductor.
Figure 9:
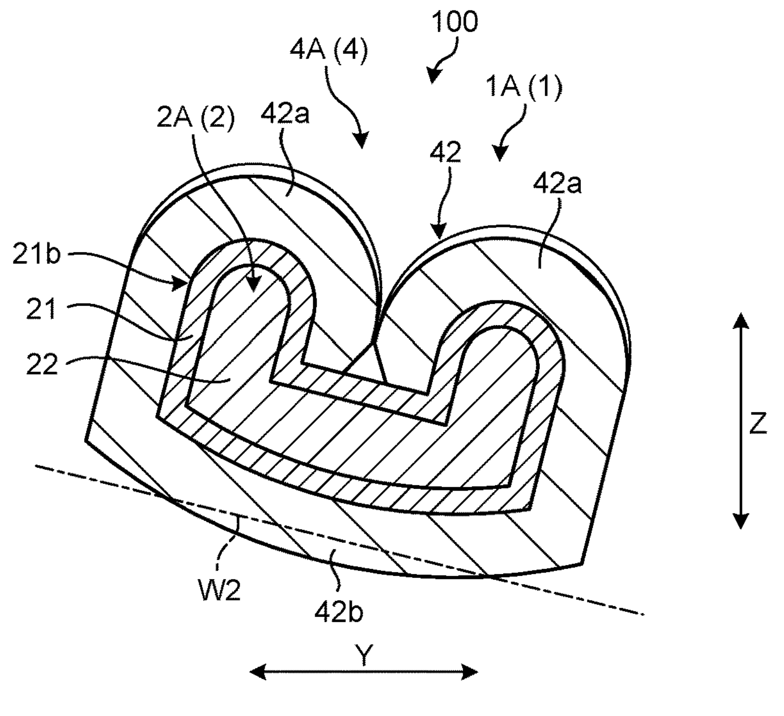
FIG. 9 is a sectional view of a second terminal joined to the connecting conductor.

FIG. 8 illustrates a section taken along VIII-VIII in FIG. 4. FIG. 9 illustrates a section taken along IX-IX in FIG. 4.

As illustrated in FIG. 1, a connector 100 of this embodiment includes first terminals 3, a first shell 11, a second shell 12, a housing 13, a front holder 14, and a shield ring 15. The exemplified connector 100 is a shield connector and performs shielding from noise using the first shell 11 and the second shell 12. Furthermore, the connector 100 grounds a shield member 16 to a case of a mating device, using the second shell 12 and the first shell 11.

The connector 100 is, for example, mounted in a vehicle, such as an automobile. The vehicle in which the connector 100 is mounted is, for example, an electric vehicle (EV), a hybrid electric vehicle (HEV), or a plug-in hybrid electric vehicle (PHEV). The mating device connected to the connector 100 may be an inverter. Electric wires 200, which will be described later, may be connected to a battery mounted in the vehicle.

The connector 100 engages with the mating device in a first direction X. The connector 100 of this embodiment includes the two first terminals 3. The exemplified first terminals 3 are female terminals and include connecting portions 31 having a cylindrical shape. The connecting portions 31 extend in the first direction X. Male terminals of the mating device are inserted into the connecting portions 31 in the first direction X and are electrically connected to the connecting portions 31. The connector 100 electrically connects the male terminals to the electric wires 200 using the terminal connecting structures 1 and third terminals 5 illustrated in FIGS. 2 to 4.

The housing 13 illustrated in FIG. 1 holds the first terminals 3 and also holds second terminals 4 and the third terminals 5, which will be described later. The housing 13 is, for example, molded from an insulating synthetic resin. The housing 13 includes two tube portions 13*a* protruding toward the front side in the first direction X. The tube portions 13*a* each accommodate one connecting portion 31. The two tube portions 13*a* are aligned in a second direction Y. The second direction Y is a direction orthogonal to the first direction X and is a width direction of the connector 100. The back of the housing 13 is closed by an insulating cover.

The first shell 11 and the second shell 12 compose a shield shell covering the housing 13. The first shell 11 and the second shell 12 are formed from a conductive material, such as metal. The first shell 11 is fixed to the case of the mating device and is electrically connected to this case. The first shell 11 includes an opening 11*a* open toward the mating device. The connecting portions 31 and the tube portions 13*a* protrude from the opening 11*a* toward the front side in the first direction X.

The second shell 12 protrudes from the first shell 11 in a third direction Z. The third direction Z is a direction orthogonal to both the first direction X and the second direction Y and is a height direction of the connector 100. The electric wires 200 are drawn out from the second shell 12 in the third direction Z. The shield member 16 covers the electric wires 200. The shield member 16 is, for example, a braided wire formed from a conductive material, such as metal. The shield member 16 is crimped onto the second shell 12 using the shield ring 15. To the connector 100 of this embodiment, two electric wires 200 are connected. The two electric wires 200 are aligned in the second direction Y.

As illustrated in FIGS. 2 to 4, the connector 100 of this embodiment includes the terminal connecting structures 1. The terminal connecting structures 1 are accommodated inside the housing 13. The terminal connecting structures 1 include connecting conductors 2, the first terminals 3, and the second terminals 4. As described above, the first terminals 3 are terminals connected to the mating device. The second terminals 4 are electrically connected to the first terminals 3 via the connecting conductors 2. The second terminals 4 are electrically connected to the electric wires 200 via the third terminals 5.

In the following description, when the two first terminals 3 of the connector 100 are distinguished from each other, one is referred to as "first terminal 3A" and the other as "first terminal 3B". Furthermore, the connecting conductor 2 and the second terminal 4 corresponding to the first terminal 3A are referred to as "connecting conductor 2A" and "second terminal 4A", and the connecting conductor 2 and the second terminal 4 corresponding to the first terminal 3B are referred to as "connecting conductor 2B" and "second terminal 4B".

Furthermore, the terminal connecting structure 1 including the first terminal 3A, the connecting conductor 2A, and the second terminal 4A is referred to as "terminal connecting structure 1A", and the terminal connecting structure 1 including the first terminal 3B, the connecting conductor 2B, and the second terminal 4B is referred to as "terminal connecting structure 1B". The two terminal connecting structures 1A and 1B each extend in the first direction X. Moreover, the two terminal connecting structures 1A and 1B face each other in the second direction Y.

FIGS. 5 and 6 illustrate the connecting conductor 2 before joining. The connecting conductor 2 includes a first braided wire 21 and a second braided wire 22. The first braided wire 21 is formed by braiding a plurality of conductive element wires 21*e*. The second braided wire 22 is formed by braiding a plurality of conductive element wires 22*e*. The element wires 21*e* and 22*e* are, for example, metal wires, such as copper wires. The first braided wire 21 and the second braided wire 22 each have a tubular shape. As illustrated in FIGS. 5 and 6, the second braided wire 22 is accommodated inside the first braided wire 21.

As illustrated in FIG. 6, the element wires 21*e* of the first braided wire 21 have a first element wire diameter E1. In the first braided wire 21 of this embodiment, all the element wires 21*e* have the first element wire diameter E1. The element wires 22*e* of the second braided wire 22 have a second element wire diameter E2. In the second braided wire 22 of this embodiment, all the element wires 22*e* have the second element wire diameter E2.

As illustrated in FIG. 5, the first braided wire 21 includes a first end portion 21*a* and a second end portion 21*b*. The first end portion 21*a* is one of end portions of the first braided wire 21 in an axial direction C1 of the first braided wire 21. The second end portion 21*b* is the other end portion of the first braided wire 21 in the axial direction C1. The second braided wire 22 extends from the first end portion 21*a* to the second end portion 21*b*. The length of the second braided wire 22 in the axial direction C1 may be the same as the length of the first braided wire 21 in the axial direction C1.

As illustrated in FIGS. 7 and 8, the first terminal 3 is joined to the first end portion 21*a*. As illustrated in FIG. 7, the exemplified first terminal 3 includes a crimped portion 32 crimped onto the connecting conductor 2. The crimped portion 32 includes a pair of crimped pieces 32*a* and 32*a* and a bottom wall 32*b*. The crimped portion 32 is crimped onto the connecting conductor 2 in a so-called B crimp form and is joined to the first end portion 21*a*. The crimped portion 32 is pressure-bonded to the connecting conductor 2 using, for example, a terminal pressure-bonding device including a crimper and an anvil.

As illustrated in FIG. 8, the crimped portion 32 of the first terminal 3 is crimped so that the sectional shape is a B shape. The crimped pieces 32*a* are pressure-bonded to the connecting conductor 2 with tips of the crimped pieces 32*a* facing the bottom wall 32*b*. The first end portion 21*a* of the connecting conductor 2 is deformed so that the sectional shape is a substantially B shape. The crimped portion 32 is pressure-bonded to at least the first braided wire 21 and is electrically connected to the first braided wire 21 and the second braided wire 22. The first braided wire 21 protects the second braided wire 22 by covering the entire periphery of the second braided wire 22.

As illustrated in FIG. 7, the second terminal 4 is joined to the second end portion 21*b* of the connecting conductor 2. The exemplified second terminal 4 is pressure-bonded to the connecting conductor 2. The second terminal 4 includes a connecting portion 41 and a crimped portion 42. The connecting portion 41 has a flat plate shape and includes a through hole 41*a*. The crimped portion 42 includes a pair of crimped pieces 42*a* and 42*a* and a bottom wall 42*b*. The second terminal 4 is joined to the connecting conductor 2 so that the axial directions of the crimped portion 42 and the connecting conductor 2 coincide with each other.

As illustrated in FIG. 9, the crimped portion 42 of the second terminal 4 is pressure-bonded to the connecting conductor 2 in a so-called B crimp form. The crimped portion 42 is pressure-bonded to the second end portion 21*b* using, for example, a terminal pressure-bonding device. The crimped pieces 42*a* are pressure-bonded to the connecting conductor 2 with tips of the crimped pieces 42*a* facing the bottom wall 42*b*. The second end portion 21*b* of the connecting conductor 2 is deformed so that the sectional shape is a substantially B shape. The crimped portion 42 is pressure-bonded to at least the first braided wire 21 and is electrically connected to the first braided wire 21 and the second braided wire 22. The first braided wire 21 protects the second braided wire 22 by covering the entire periphery of the second braided wire 22.

As illustrated in FIG. 7, in the second terminal 4, the connecting portion 41 is orthogonal to the axial direction of the crimped portion 42. In other words, the second terminal 4 is bent into an L shape between the connecting portion 41 and the crimped portion 42. The connecting portion 41, for example, protrudes from the crimped portion 42 toward a direction orthogonal to the first direction X.

As illustrated in FIGS. 7 and 8, inside the connector 100, the first terminal 3 and the second terminal 4 are in different rotational positions relative to the axial direction of the connecting conductor 2. Herein, the rotational positions of the first terminal 3 and the second terminal 4 are rotational positions relating to the axial direction C1 of the connecting conductor 2. That is, the rotational positions of the first terminal 3 and the second terminal 4 are positions in a rotational direction relating to the central axis of the connecting conductor 2.

As illustrated in FIG. 8, the first terminal 3 is held so that a width direction W1 of the bottom wall 32*b* extends in the third direction Z. In the exemplified connector 100, the width direction W1 coincides with the third direction Z. As illustrated in FIG. 9, the second terminal 4 is held so that a width direction W2 of the bottom wall 42*b* inclines relative to the second direction Y. In the exemplified connector 100, the width direction W2 inclines relative to both the second direction Y and the third direction Z.

By inclining the bottom walls 42*b* of the second terminals 4 in this way, a space Wd1 between the connecting portions 31 can be reduced as illustrated in FIG. 3. The connecting portions 41 of the second terminals 4 incline relative to the third direction Z so as to approach each other from the through holes 41*a* toward the crimped portions 42. By inclining the second terminals 4, the connector 100 can be made compact. For example, the housing 13 can be made compact in the second direction Y and the third direction Z. Furthermore, by inclining the second terminals 4, the space Wd1 between the connecting portions 31 can readily be adjusted to a desired value. For example, the space Wd1 between the connecting portions 31 can be set freely relative to a space Wd2 between the electric wires 200.

The rotational positions of the first terminals 3 and the second terminals 4 relative to the connecting conductors 2 may mutually differ when the terminals 3 and 4 are joined to the connecting conductors 2. In this case, the first terminals 3 are joined to the connecting conductors 2 in a first rotational position, and the second terminals 4 are joined to the connecting conductors 2 in a second rotational position. The first rotational position and the second rotational position are positions in different phases relative to the axial direction C1.

The rotational positions of the first terminals 3 and the second terminals 4 relative to the connecting conductors 2 may be mutually different positions when the terminal connecting structures 1 are assembled to the housing 13. In this case, the terminal connecting structures 1 are, for example, assembled to the housing 13 while the connecting conductors 2 are subjected to torsion. The connecting conductors 2 of this embodiment are each composed of the two braided wires 21 and 22 combined and thus have high flexibility toward torsional deformation. The connecting conductors 2 may have extra length to allow for torsional deformation.

As illustrated in FIG. 4, the connecting portion 41 of the second terminal 4 is connected to the third terminal 5. The third terminal 5 is a terminal connected to the electric wire 200 and extends in the third direction Z. The third terminal 5 includes a connecting portion 51 and a crimped portion 52. The crimped portion 52 is pressure-bonded to a core wire of the electric wire 200. The connecting portion 41 of the second terminal 4 and the connecting portion 51 of the third terminal 5 are fastened by a bolt 6. To be more specific, the bolt 6 is inserted into a through hole of the connecting portion 51 and the through hole 41*a* of the connecting portion 41 and is screwed into a nut 13*b*. The nut 13*b* is held by the housing 13. That is, the second terminal 4 and the third terminal 5 are fixed to the housing 13 using the bolt 6.

As illustrated in FIG. 7, the connecting conductor 2 includes an intermediate portion 2*c*. The intermediate portion 2*c* is a portion between the first end portion 21*a* and the second end portion 21*b*. In other words, the intermediate portion 2*c* is a portion between the first terminal 3 and the second terminal 4. The intermediate portion 2*c* has flexibility and allows for relative movement of the first terminal 3 relative to the second terminal 4 and change in the orientation of the first terminal 3. For example, the intermediate portion 2*c* can restrain transmission of vibration or external force input to the second terminal 4, to the first terminal 3.

As described above, the terminal connecting structure 1 of this embodiment includes the first braided wire 21, the second braided wire 22, the first terminal 3, and the second terminal 4. The first braided wire 21 is formed by braiding the element wires 21*e* having the first element wire diameter E1 and includes the first end portion 21*a* and the second end portion 21*b*. The second braided wire 22 is formed by braiding the element wires 22*e* having the second element wire diameter E2. The second braided wire 22 is accommodated inside the first braided wire 21 and extends from the first end portion 21*a* to the second end portion 21*b*. The first terminal 3 is joined to the first end portion 21*a*. The second terminal 4 is joined to the second end portion 21*b*. The first element wire diameter E1 is greater than the second element wire diameter E2.

When the first terminal 3 is joined to the first end portion 21*a*, the first braided wire 21 can be interposed between the second braided wire 22 and the first terminal 3 to protect the second braided wire 22. Similarly, when the second terminal 4 is joined to the second end portion 21*b*, the first braided wire 21 can be interposed between the second braided wire 22 and the second terminal 4 to protect the second braided wire 22. In the terminal connecting structure 1 of this embodiment, the first element wire diameter E1 is greater than the second element wire diameter E2. Thus, the first braided wire 21 can prevent element wire breakage of its own element wires 21*e* and can also prevent element wire breakage of the element wires 22$e$ of the second braided wire 22. In this way, the terminal connecting structure 1 of this embodiment can both ensure flexibility of the connecting conductor 2 and prevent element wire breakage in joining, of the connecting conductor 2.

The first element wire diameter E1 may be, for example, 0.12 [mm] or 0.32 [mm]. The second element wire diameter E2 may be 0.05 [mm] or 0.08 [mm]. The ratio (E1/E2) of the first element wire diameter E1 to the second element wire diameter E2 may be, for example, a value in the range expressed by the following expression (1):

$$1.5 \leq E1/E2 \leq 6.4 \quad (1)$$

The connector 100 of this embodiment includes the housing 13, the first terminals 3, the second terminals 4, and the connecting conductors 2. The first terminals 3 are accommodated in the housing 13 and connected to the mating terminals. The second terminals 4 are accommodated in the housing 13 and connected to the electric wires 200. The connecting conductors 2 include the first end portions 21$a$ joined to the first terminals 3 and the second end portions 21$b$ joined to the second terminals 4 and electrically connect the first terminals 3 to the second terminals 4.

The connecting conductors 2 include the first braided wires 21 and the second braided wires 22. The first braided wires 21 are formed by braiding the element wires 21$e$ having the first element wire diameter E1 and include the first end portions 21$a$ and the second end portions 21$b$. The second braided wires 22 are formed by braiding the element wires 22$e$ having the second element wire diameter E2, are accommodated inside the first braided wires 21, and extend from the first end portions 21$a$ to the second end portions 21$b$. The first element wire diameter E1 is greater than the second element wire diameter E2. The connector 100 of this embodiment can both ensure flexibility of the connecting conductors 2 and prevent element wire breakage of the connecting conductors 2 in joining.

The second terminals 4 of this embodiment are fixed to the housing 13 using the bolts 6. The bolts 6 are an example of fastening members fixing the second terminals 4. The connector 100 of this embodiment can reduce moments and loads on the first terminals 3 by connecting the first terminals 3 to the second terminals 4 using the connecting conductors 2 having flexibility.

Note that the form of pressure-bonding the first terminals 3 and the second terminals 4 to the connecting conductors 2 is not limited to B crimp. The method of joining the first terminals 3 and the second terminals 4 to the connecting conductors 2 is not limited to pressure-bonding. The first terminals 3 and the second terminals 4 may be ultrasonically joined to the connecting conductors 2, for example. The first braided wires 21 can protect the second braided wires 22 and prevent element wire breakage of the element wires 22$e$ in vibration.

The connecting conductors 2 may be bent between the first terminals 3 and the second terminals 4. For example, the connecting conductors 2 may be bent into an L shape between the first terminals 3 and the second terminals 4. In this case, the second terminals 4 may be joined to the core wires of the electric wires 200. For example, the second terminals 4 may include crimped portions pressure-bonded to the electric wires 200, instead of the connecting portions 41.

Note that the target to which the terminal connecting structure 1 is applied is not limited to the connector 100 connecting the mating terminal to the electric wire 200. The terminal connecting structure 1 may be used as a ground wire in a vehicle, for example. In this case, for example, the first terminal is connected to the battery, and the second terminal is connected to the vehicle body.

The contents disclosed in the above-described embodiment can be combined and implemented as appropriate.

In a connecting conductor of the terminal connecting structure according to the present embodiment, the first braided wire is formed by braiding the element wire having the first element wire diameter, and the second braided wire is formed by braiding the element wire having the second element wire diameter. The first element wire diameter is greater than the second element wire diameter. The terminal connecting structure of the present invention achieves effect of both ensuring flexibility of the connecting conductor and preventing element wire breakage of the connecting conductor.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A terminal connecting structure comprising:

a first braided wire formed by braiding a conductive metal wire having a first element wire diameter, the first braided wire including a first end portion and a second end portion;

a second braided wire formed by braiding a conductive metal wire having a second element wire diameter, the second braided wire being accommodated inside the first braided wire, the second braided wire extending from the first end portion to the second end portion;

a first terminal joined to the first end portion, and electrically connected to both the first braided wire and the second braided wire; and a second terminal joined to the second end portion, and electrically connected to both the first braided wire and the second braided wire, wherein the first element wire diameter being greater than the second element wire diameter.

2. A connector comprising:

a housing;

a first terminal accommodated in the housing and connected to a mating terminal;

a second terminal accommodated in the housing and connected to an electric wire; and a connecting conductor including a first end portion and a second end portion, the first end portion being joined to the first terminal, the second end portion being joined to the second terminal, the connecting conductor electrically connecting the first terminal to the second terminal, wherein the connecting conductor including:

a first braided wire formed by braiding a conductive metal wire having a first element wire diameter, the first braided wire including the first end portion and the second end portion; and a second braided wire formed by braiding a conductive metal wire having a second element wire diameter, the second braided wire being accommodated inside the first braided wire, the second braided wire extending from the first end portion to the second end portion, the first terminal is electrically connected to both the first braided wire and the second braided wire in the first end portion, the second terminal is electrically connected to both the first braided wire and the second braided wire in the second end portion, and the first element wire diameter being greater than the second element wire diameter.

3. The connector according to claim 2, wherein the second terminal is fixed to the housing using a fastening member.

4. A connecting conductor for connecting a first terminal to a second terminal, the connecting conductor comprising:

a first braided wire formed by braiding a conductive metal wire having a first element wire diameter, the first braided wire including a first end portion and a second end portion; and a second braided wire formed by braiding a conductive metal wire having a second element wire diameter, the second braided wire being accommodated inside the first braided wire, wherein the second braided wire extending from the first end portion to the second end portion, and the first element wire diameter being greater than the second element wire diameter, and the first braided wire is directly connected onto an exterior surface of the second braided wire.

* * * * *